US007451534B2

(12) United States Patent
Kress

(10) Patent No.: US 7,451,534 B2
(45) Date of Patent: Nov. 18, 2008

(54) VALVE SEAT AND VALVE GUIDE MACHINING TOOL

(75) Inventor: Dieter Kress, Aalen (DE)

(73) Assignee: MAPAL Fabrik fur Prazisionswerkzeuge Dr. Kress KG, Aalen (DE)

( * ) Notice: Subject to any disclaimer, the term of this patent is extended or adjusted under 35 U.S.C. 154(b) by 81 days.

(21) Appl. No.: 11/632,873

(22) PCT Filed: Jun. 20, 2006

(86) PCT No.: PCT/EP2006/005886

§ 371 (c)(1), (2), (4) Date: Jan. 19, 2007

(87) PCT Pub. No.: WO2006/136361

PCT Pub. Date: Dec. 28, 2006

(65) Prior Publication Data

US 2008/0089755 A1 Apr. 17, 2008

(30) Foreign Application Priority Data

Jun. 20, 2005 (DE) ........................ 10 2005 028 368

(51) Int. Cl.
*B23P 13/00* (2006.01)

(52) U.S. Cl. .......................... 29/50; 409/234; 408/83.5; 408/224; 408/226; 407/119

(58) Field of Classification Search ..................... 29/50, 29/558, 53, 56.5; 409/234, 192, 203, 213, 409/217, 232, 136; 408/224, 226, 231–233, 408/83.5, 56; 407/31, 118–119
See application file for complete search history.

(56) References Cited

U.S. PATENT DOCUMENTS

| | | | | |
|---|---|---|---|---|
| 4,050,840 | A | 9/1977 | Skingle | |
| 4,279,550 | A * | 7/1981 | Kress et al. | 408/59 |
| 5,098,233 | A * | 3/1992 | Patterson et al. | 407/118 |
| 6,902,355 | B2 * | 6/2005 | Kress et al. | 409/234 |
| 6,905,278 | B2 * | 6/2005 | Kress et al. | 409/234 |
| 7,097,400 | B2 | 8/2006 | Kress et al. | |
| 7,363,692 | B2 * | 4/2008 | Kress et al. | 29/50 |
| 2003/0012616 | A1 * | 1/2003 | Kress et al. | 409/234 |
| 2003/0072628 | A1 * | 4/2003 | Yamamoto et al. | 408/226 |
| 2003/0075879 | A1 * | 4/2003 | Lundblad et al. | 409/234 |
| 2005/0002746 | A1 | 1/2005 | Kress et al. | |
| 2006/0275090 | A1 * | 12/2006 | Onozuka et al. | 408/143 |
| 2007/0028434 | A1 * | 2/2007 | Kress et al. | 29/50 |

FOREIGN PATENT DOCUMENTS

| | | | |
|---|---|---|---|
| DE | 2610386 | A1 | 10/1976 |
| DE | 3314349 | A1 | 10/1984 |
| DE | 19960927 | C2 | 1/2001 |
| DE | 10114240 | A1 | 1/2003 |
| DE | 10137000 | A1 | 2/2003 |
| WO | WO-03013771 | A | 2/2003 |

OTHER PUBLICATIONS

Definition of “heavy metal”, “Hawley’s Condensed Chemical Dictionary, 14th ed.”, Copyright 2002 by John Wiley & Sons, Inc., one page.*

* cited by examiner

*Primary Examiner*—Erica E Cadugan
(74) *Attorney, Agent, or Firm*—Harness, Dickey & Pierce, P.L.C.

(57) ABSTRACT

A valve seat and valve guide machining tool for the precision machining of valve seats and valve guides in a cylinder head of an internal combustion engine is disclosed, comprising at least two tool parts (3,5) of which a first comprises at least one geometrically defined cutter (11), provided for the valve seat 7 3 9 1 11 19 31 17 25 45 23 39 5 41 13 15 35 37 43 27 29 33 21 machining and a second comprises at least one geometrically-defined cutter (15), provided for valve guide machining, which are connected to each other by means of a precision interface (17). The precision interface (17) is a squat conical connection, comprising a first plane surface (19) on the first tool part (3) and second plane surface (21) on the second tool part (5), arranged perpendicular to a mid-axis (23) of the tool (1) and, in the assembled state of the tool (1), lie adjacent to each other, said first tool part (3) being made from steel. The tool is characterised in that the second tool part (5) is divided into two sections (39,41) of which a first section (39) is made from a hard metal and is provided with the precision interface (17) and a second section (41) is made from a material which is more elastic than the material of the first tool part (3), and comprises the at least one cutter (13) of the second tool part (5).

19 Claims, 3 Drawing Sheets

23
65
61
63
15
59''
13
35
57
55
59
41
49
53
43
47

5
59'
39
51
45
21
17

VALVE SEAT AND VALVE GUIDE MACHINING TOOL

CROSS-REFERENCE TO RELATED APPLICATIONS

This application is a 371 US National Stage of International Application No. PCT/EP2006/005886, filed Jun. 20, 2006. This application claims the benefit of German Application DE 10 2005028 368.3, filed Jun. 20, 2005. The disclosure of the above application is incorporated herein by reference.

DESCRIPTION

The invention relates to a valve seat and valve guide machining tool for fine machining of valve seat and valve guide in a cylinder head of a combustion engine in accordance with the preamble of claim 1.

Tools of the kind addressed here are known (DE 101 37 000 A1). It has emerged that when machining a valve seat and valve guide in the cylinder head of a combustion engine surface quality in the area of the valve guide on the one hand and the coaxiality between valve and valve guide on the other hand are of great importance. Coaxiality is an important criterion for the tightness and for the use of the combustion engine. The quality of the surface area of the valve guide is essential for low-wear operation of the combustion engine. In a known tool, two tool parts are provided, of which a first is assigned to valve seat machining and a second to valve guide machining. The two tool parts are connected to each other through a precision interface, wherein one tool part has a truncated cone and the other a conical seat for the truncated cone. Both tool parts have flat surfaces in the area of the precision interface which are located perpendicular to the center axis of the tool. The precise coaxial alignment of the two tool parts to each other is ensured by the precision interface. It effects a clear increase in the stiffness of the tool so that bending in the area of the second part of the tool is reduced. The surface qualities of valve seat and valve guide are increased still further because vibrations occurring in the fine machining of the areas mentioned inside the tool are suppressed by the precision interface and thus strongly dampened. By selecting different materials for the two tool parts, vibration is reduced still further. Steel is used for the first tool part for valve seat machining and carbide for the second tool part for valve guide machining. It has been shown that in some cases surface quality in the area of the valve guide is not adequate and relative high wear results on the second tool part.

The object of the invention is therefore to create a valve seat and valve guide machining tool for fine machining of valve seat and valve guide in a cylinder head of a combustion engine which does not suffer from this disadvantage.

To achieve this object, a valve seat and valve guide machining tool is proposed which has the features named in claim 1. The tool comprises in turn two tool parts, one of which is assigned to machining the valve seat and a second tool is assigned to machining the valve guide. The first tool for machining the valve seat is made in turn from steel. The tool however is distinguished by the fact that the second part of the tool is divided and has two sections of which only one is of carbide, namely the first section which is allocated to the precision interface. The second section of the second tool part consists of a material which is more ductile than that of the first section. It is therefore possible that the second section of the second tool part conforms optimally to the surface of the valve guide because of its ductility, preventing rapid wear of the second tool part and substantially improving the surface quality of the valve guide.

An embodiment of the tool is preferred whose characteristics are that the second section consists of steel or heavy metal. These materials are characterized by greater ductility than carbide so that the second tool part in the area of the second section can conform better to the surface of the valve guide. The resulting additional advantage is that the material of the second section is easier to machine than that of the first section.

Additional embodiments become clear from the remaining dependent claims.

The invention is explained in more detail from the drawing.

Figure 1:
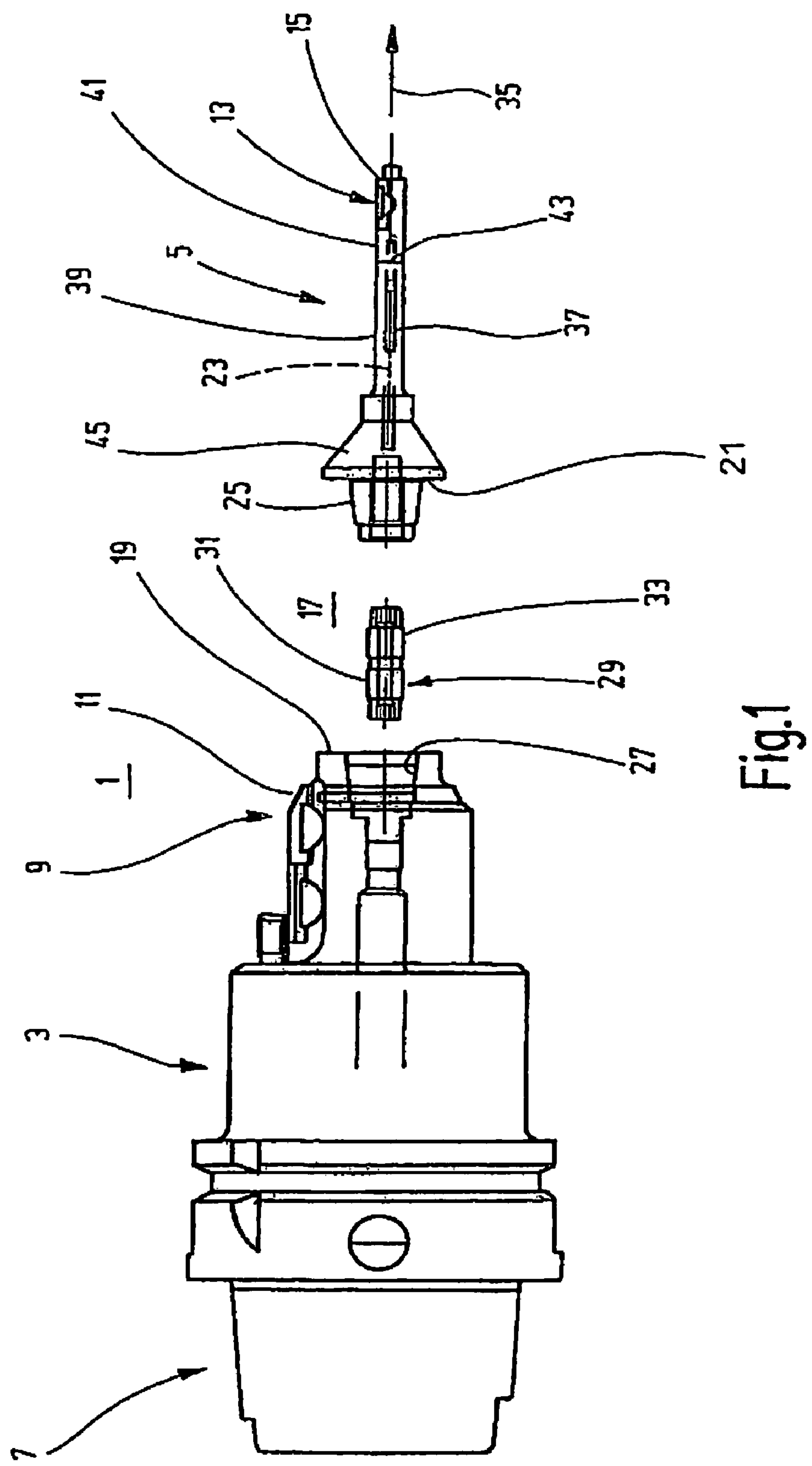
FIG. 1 shows a principal view of a valve seat and valve guide machining tool in a side view as an exploded drawing.

FIG. 1 shows a valve seat and valve guide machining tool designated in what follows as tool 1 which has two tool parts, namely a first tool part 3 used for valve seat machining and a second tool part 5 used for valve guide machining. The first tool part 3 here has a shaft 7 which is used to connect tool 1 to a machine tool. It is configured correspondingly and, as an example, provided here with a conical outer surface. It further comprises a cutter plate 9 with a blade 11 which is used for machining a valve seat.

The second tool part 5 also has a cutter plate 13 which comprises a geometrically determined blade 15.

The two tool parts 3 and 5 are connected by a precision interface 17 which is configured as a truncated cone connection and a first flat surface 19 on the first tool part 3 and a second flat surface 21 on the second tool part 5. The flat surfaces are located perpendicular to the rotational and center axis 23 of the tool 1. The precision interface 17 comprises a cone on the one hand and on the other a recess to receive the cone. The intention here is that the cone 25 is provided on the second tool part 5 and the conically configured recess 27 on the first tool part 3.

A clamping screw is shown in the exploded drawing which is provided with a first threaded section which engages the first tool part 3, in addition with a second threaded section 33 which engages the tool part 5. The threaded sections 31, 33 comprise opposite threads. If the clamping screw is turned in a first direction, the two parts of the tool 3 and 5 are clamped together in the area of the precision interface 17, where the cone 25 is pulled into the recess 27 and the flat surfaces 19 and 21, which are configured here as annular surfaces, abut solidly against each other.

With a turn of the clamping screw 29 in the opposite direction, the two parts of the tool 3 and 5 are pushed apart so that the clamping forces between cone 25 and recess 27 are loosened.

When fine machining the valve seat and valve guide in the cylinder block of a combustion engine, the two tool parts 3 and 5 are clamped together by the precision interface 17, which results in a high degree of rigidity for the tool 1, and in addition absolutely precise locational positioning of the tool parts 3 and 5 to each other.

The second tool part 5 is configured as a reamer which is used to machine the valve guide. The first tool part 3 is used to machine the valve seat. For this reason the blade 11 of the cutting plate 9 of the first tool part inclined at an angle to the center axis. Incidentally, it slopes in the advance direction of the tool indicated by an arrow 35.

In the area of the second tool part 5 at least one guide strip is provided by way of which the second tool part 5 supports itself against the surface of a valve seat guide while it is being machined by the blade 15 of the cutter plate 3.

It should be pointed out that the blades 11 and 15 of the cutter plates 9 and 13 can also be provided directly on the base body of the tool parts 3 and 5. In order to ensure adjustability of the blades, they are preferably part of a cutter plate, as shown here, which coacts with a suitable adjusting mechanism.

In FIG. 1 it is indicated that the second tool part 5 has a first section 39 and a second section 41 which are configured as separate elements and joined. Here only a dividing line 43 can be seen which reveals the contact area between the two sections 39 and 41.

The principal view from FIG. 1 shows that the first tool part 3 has a larger outside diameter than the second tool part 5. This is because of a cylindrical area with a small diameter in a conical area 45 on which the second flat surface 21 is provided. In the area of the flat surface 21 the outer diameter of the second tool part 5 is considerably larger than, for example, in the area of the dividing line 43. The length of the cylindrical area to the right and left of this dividing line 43 is selected as a function of the length of the guide of the valve guide.

Figure 2:
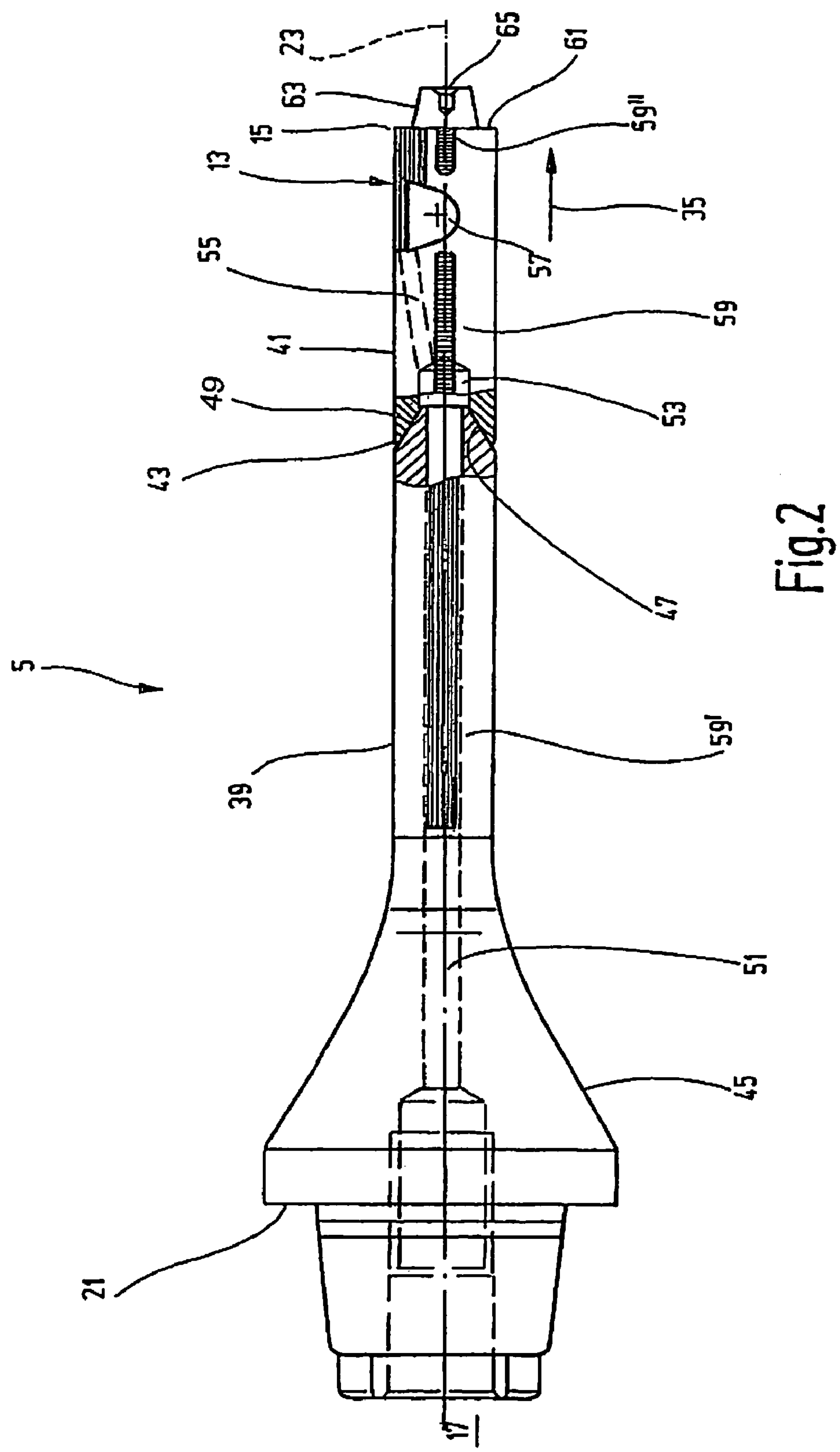
FIG. 2 shows a side view of part of the tool shown in FIG. 1.

From FIG. 2 the second tool part 5 of the tool 1 can be seen in a side view. It is reproduced in partial section. Identical parts are given identical reference numerals so that in this regard reference is made to the description for FIG. 1.

The tool part 2 is shown enlarged so that details are more recognizable than in FIG. 1. It is clearly recognizable here that the second tool part 5 has two sections 39 and 41 which are connected in a suitable way, here soldered together.

Here it is clearly recognizable that the second section 41 and the area of the first section 39 bordering the dividing line 43 have a cylindrical outer surface and the cylindrical outer surface of the first section 39 transitions over a conical area 45 into the flat surface of the precision interface 17 running perpendicular to the center axis.

From the partial section in FIG. 2 it is clearly recognizable that the second tool part 5 is made up of the two sections 39 and 41. They are not butted against each other in the area of the dividing line 43. Instead, one of the sections has a projection and the other has a matching recess which the projection engages. Here the intention is that the first section 39 has a conical or truncated conical projection 47 in the connecting area indicated by the dividing line 43 which engages a correspondingly conical or truncated conical recess 49 in the second section 41. The projection 47 is preferably soldered into the recess 49.

The second tool part 5 has a coolant/lubricant passage 51 running concentrically here to the center axis 23 through which a coolant/lubricant is supplied to the blade 15 of the cutter plate 13. The coolant/lubricant passage 51 runs through the first section 39 and empties in a distributor chamber 53 which connects here to the recess 49 in the second section 41. A passage runs from here which rises opposite the center axis 23 from the distributor chamber 53 in the direction of the advance mechanism indicated by the arrow 35 and brings coolant/lubricant into the area of the blade 15.

The cutter plate 13 is held by a chucking jaw 57 which is retained by a screw in the main body of the second section 41. Normally tightening bolts are used which are known and therefore not shown here.

The second part of the tool 5 has at least one guide bead 59. The intention here is that each of the two sections 39 and 41 has its own guide bead. The first guide bead 59 in the area of the second section 41 continues on the other side of the dividing line 43 in the guide bead 59' of the first section 39. The intention here is that the first guide bead 59 is narrower than the guide bead 59'. FIG. 2 reveals that the first guide bead 59 continues to the right beyond the chucking jaw 57 after an interruption and thus comprises a guide bead element 59".

A centering element 63 which comprises a centering hole 65 is mounted on the face 61 of the second part of the tool 5. It is used for machining the tool 1 or the second tool part 5 when manufacturing the tool and as part of repairs. Center bores of the type discussed here are known so that there is no need to pursue them further.

The first guide bead 59 of the second section 41 and the corresponding guide bead 59' in the area of the first section 39 as well as the guide bead element 59" which forms the extension of the first guide bead 59, extend parallel to the center axis of 23 of the tool 1 and thus lie along one line.

Figure 3:
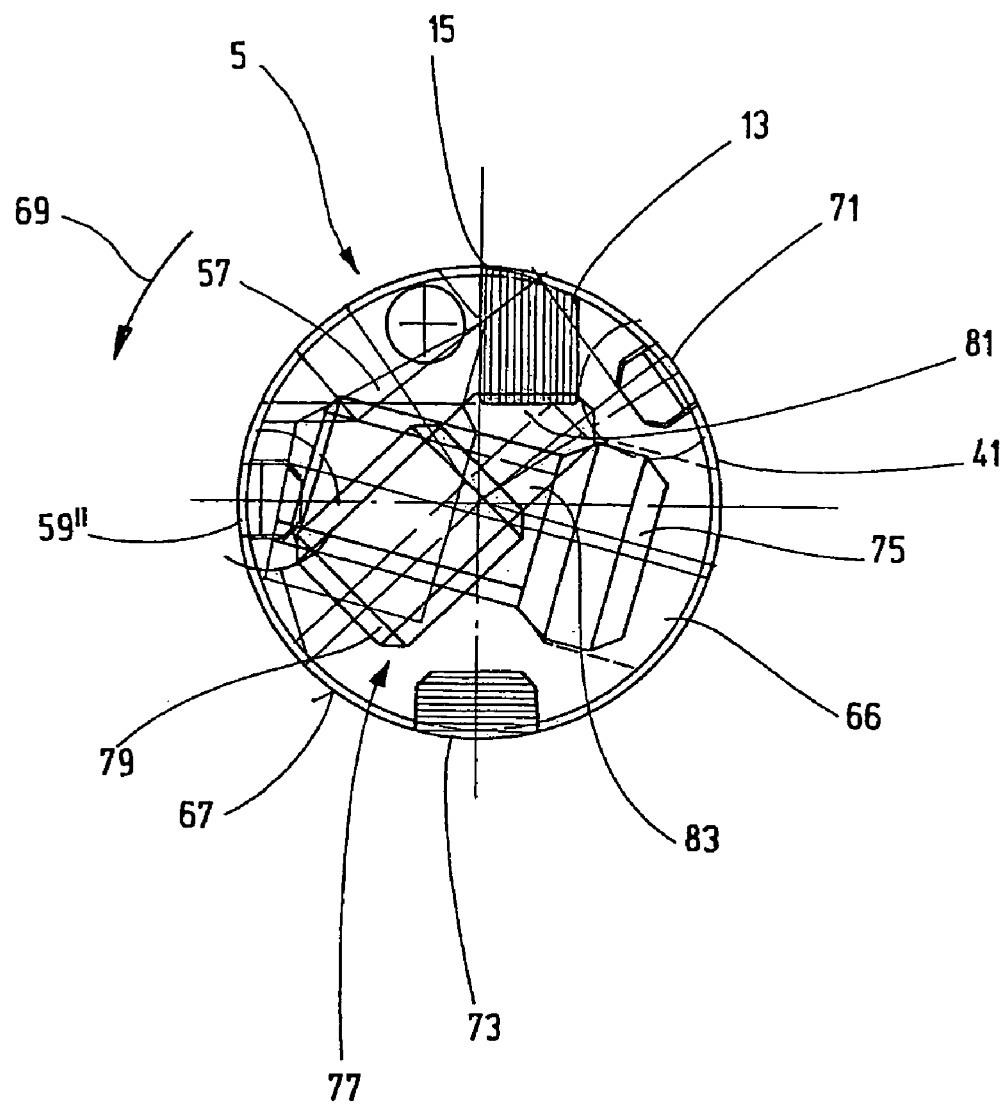
FIG. 3 shows an enlarged end view of the tool part from FIG. 2.

FIG. 3 shows the second tool part in an end view, that is a view of the face 61. Identical parts are given identical reference numerals so that reference is made to the description of the preceding figures. For reasons of greater clarity, the centering element 63 is omitted.

FIG. 3 shows clearly that the second section 41 of the second part of the tool 5 has a base body 66 into which the cutter plate 13 with the blade 15 is inserted. Similarly the first guide bead, of which the guide bead element 59" is recognizable, is set into the circumferential surface 67 of the second part of the tool 5. The guide bead element 59" follows the blade 15 by 270° in the direction of rotation of the tool indicated by an arrow 69. An additional guide bead element 71 follows the blade by approx. 45°. Finally, a third guide bead 73 is provided which lies diametrically opposite the blade 15.

The chucking jaw 57 is indicated by lines in FIG. 3 which is clamped by a locking screw 75 to the base body of the second part of the tool 5. Finally, FIG. 3 shows an adjusting device 77 with the aid of which the extension of the blade 15 can be adjusted, that is the radial extension of the blade 15. The adjusting device 77 has an adjusting screw 79 which coacts with the underside of the cutter plate 13 lying opposite the blade 15, not directly but by way of an adjusting wedge 83.

Adjusting devices 77 of the type addressed here are fundamentally known so that no further discussion is necessary.

In the case of the tool 11, provision is made that the first part of the tool 3 is made of steel. It was already indicated above that the second part of the tool consists of carbide in known tools. Here provision is made that only the first section 39 of the second part of the tool 5 is made of carbide and that the second part 41 consists of steel or heavy metal. It is crucial that the second section 41 of the second part of the tool 5 consist of a metal that is more ductile than the material of the first section 39.

Different materials are used within the second part of the tool 5, where the material of the second section 41 is more ductile than that of the first section 39. The tool 1 is further characterized in that it is more easily machined. It is possible to realize a groove to receive the cutter plate 13 in the second section 41 in a relatively inexpensive manner, furthermore a recess in which the clamping jaw 57 comes to rest. Finally, the clamping screw 75 and the adjusting device 77 can be installed relatively easily into the base body 66 of the second section 41 with the appropriate threads.

The characteristics of second part of the tool 5 are that the second section 41 is so ductile that it can lie flush on the surface of the valve guide. In this way, the at least one guide bead of the second guide section lies optimally against the valve guide surface while the latter is undergoing metalremoving fine machining by means of the blade 15. The optimal position of the second section 41 against the valve guide surface results in improved surface quality, and in addition reduced wear on the blade 15. Beyond that, it is easier to machine the material of the second section 41 which consists of steel or heavy metal and not of carbide in order to insert the cutter plate 13, the clamping jaw 57, the adjusting device and the guide beads into the base body of the second section 41.

Provision is preferably made that at least one guide bead, here the guide bead 73, lies diametrically opposite the blade 15. Finally, a third guide bead is provided in the circumferential surface 67 of the second section 41. Advantageously the guide bead 71 is also provided, following the blade 15 by approx. 45° in order to ensure optimal guidance of the tool in the valve guide which is to be machined. Finally, an especially good guidance results from a third guide bead being provided in the circumferential surface 67 of the second section 41.

What is claimed is:

1. A valve seat and valve guide machining tool for fine machining a valve seat and a valve guide in a cylinder head of a combustion engine, the tool comprising:

at least two tool parts of which a first tool part has at least a geometrically defined blade and is assigned to machining the valve seat, and a second tool part has at least a geometrically defined blade and is assigned to machining the valve guide, the first and second tool parts connected by a precision interface;

wherein the precision interface is configured as a truncated cone connection and has a first flat surface on the first part of the tool and a second flat surface on the second part of the tool which are positioned perpendicular to a center axis of the tool and in the assembled state of the tool abut each other;

the first tool part consists of steel;

wherein the second tool part is divided and has two sections of which a first section consists of carbide and is assigned to the precision interface and a second section consists of a material which is more ductile than the material of the first part of the tool and which has at least one blade of the second part of the tool.

2. The tool of claim 1, wherein the second section consists of steel or heavy metal.

3. The tool of claim 1, wherein a projection and a recess are provided in the connecting area between the first section of the second part of the tool and the second section of the second part of the tool.

4. The tool of claim 3, wherein the projection and the recess are configured as a cone or a truncated cone.

5. The tool of claim 3, wherein the projection is provided on the first section and the recess on the second section of the second part of the tool.

6. The tool of claim 1 wherein a coolant/lubricant passage runs through the tool concentric to its center axis.

7. The tool of claim 1 wherein coolant/lubricant flows through a distribution chamber for the coolant/lubricant which is provided in the area joining the two sections of the second part of the tool.

8. The tool of claim 7, wherein the distribution chamber borders a recess in the second section of the second part of the tool.

9. The tool of claim 1, wherein the blade of the second section is part of a cutting plate.

10. The tool of claim 9, wherein the culling plate is tightened by a chucking jaw on the second section.

11. The tool of claim 9, wherein an adjusting mechanism is assigned to the culling plate.

12. The tool of claim 11, wherein the adjusting mechanism has an adjusting screw and an adjusting wedge.

13. The tool of claim 1, wherein the second part of the tool has at least one guide bead.

14. The tool of claim 13 , wherein the at least one guide bead of the second section is divided in two.

15. The tool of claim 1, wherein the first section and the second section of the second part of the tool have at least one guide bead.

16. The tool of claim 15, wherein the width of the at least one guide bead of the first section is different than the width of the at least one guide bead of the second section.

17. The tool of claim 1, wherein the second section has a guide bead following the blade—viewed in the direction of rotation—where the guide bead follows at approximately 45°.

18. The tool of claim 1, wherein the second section has a guide bead positioned opposite the blade.

19. The tool of claim 1, wherein the second section has a guide bead following the blade by approx. 270°.

* * * * *

UNITED STATES PATENT AND TRADEMARK OFFICE

CERTIFICATE OF CORRECTION

PATENT NO. : 7,451,534 B2
APPLICATION NO. : 11/632873
DATED : November 18, 2008
INVENTOR(S) : Dieter Kress It is certified that error appears in the above-identified patent and that said Letters Patent is hereby corrected as shown below:

Claim 10, Column 6, line 21 (line 1), "culling" should be --cutting--.
Claim 11, Column 6, line 24 (line 2), "culling" should be --cutting--.

Signed and Sealed this

Twenty-fourth Day of February, 2009

JOHN DOLL
*Acting Director of the United States Patent and Trademark Office*